Jan. 15, 1957 L. F. THORLA, JR 2,777,539
SPRING-APPLIED DISK PARKING BRAKE
Filed Dec. 5, 1952 2 Sheets-Sheet 1
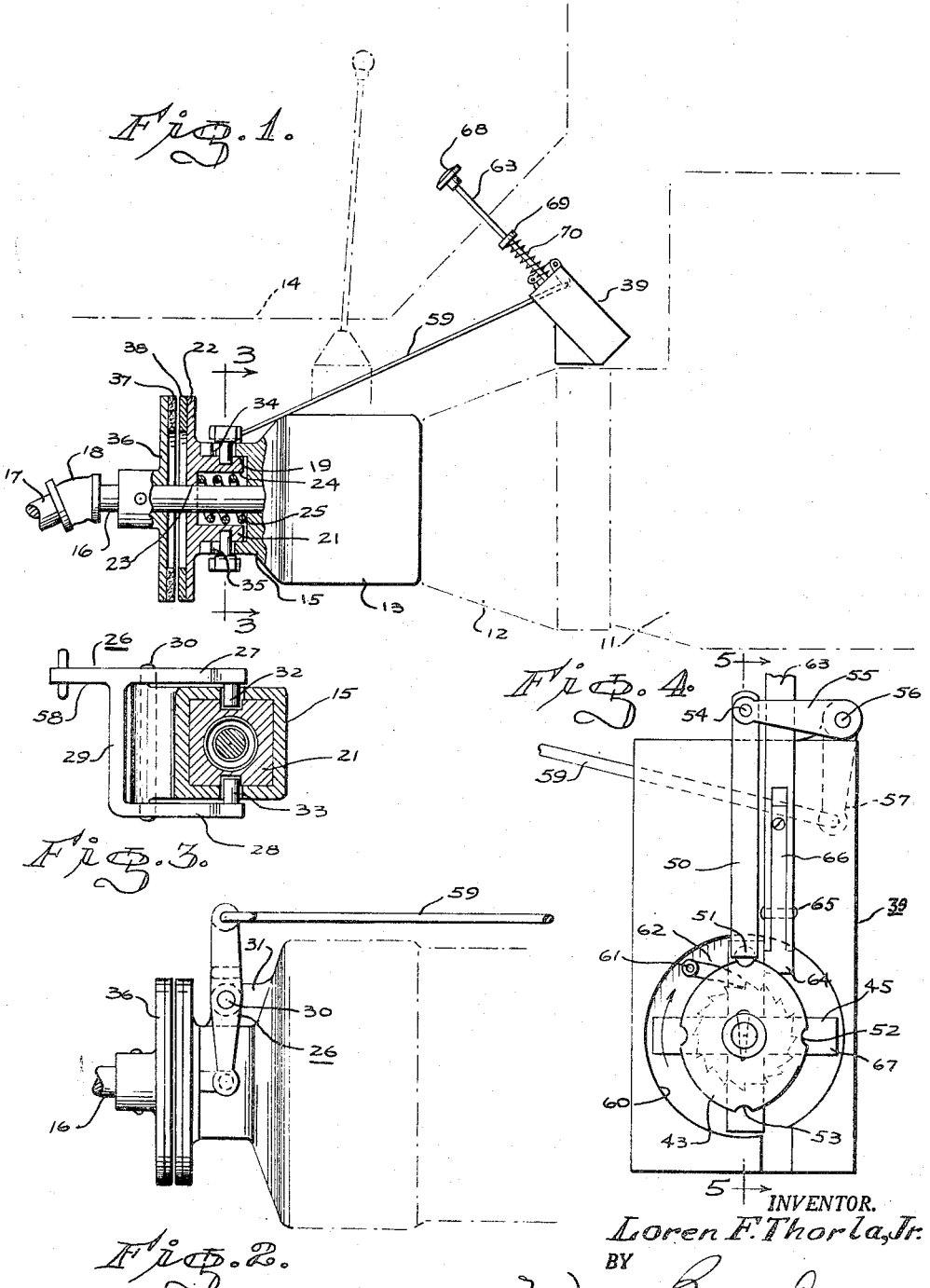
INVENTOR.
Loren F. Thorla, Jr.
BY
ATTORNEYS Jan. 15, 1957 L. F. THORLA, JR 2,777,539
SPRING-APPLIED DISK PARKING BRAKE
Filed Dec. 5, 1952 2 Sheets-Sheet 2
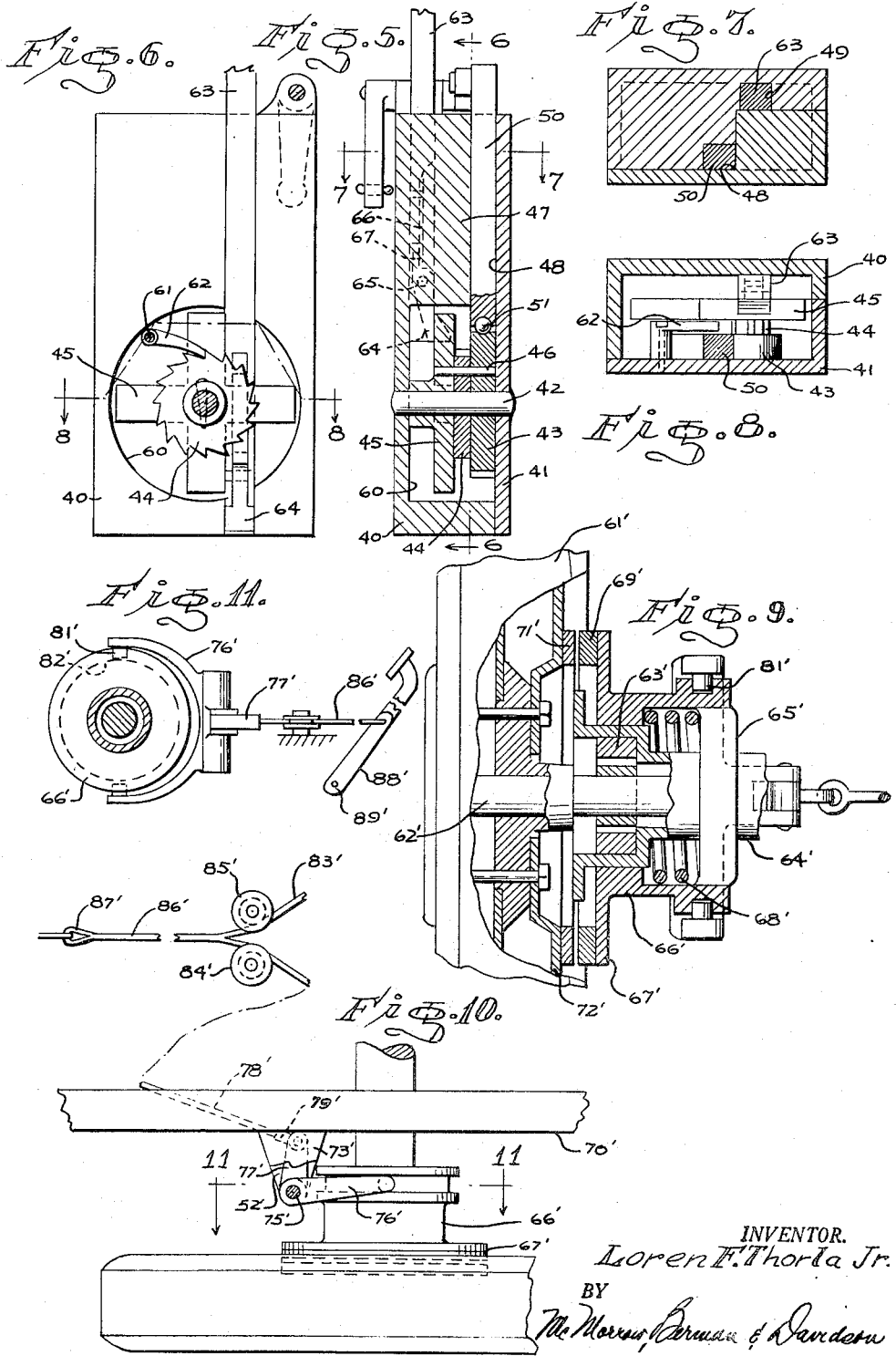
INVENTOR.
Loren F. Thorla Jr.
BY
ATTORNEYS United States Patent Office 2,777,539
Patented Jan. 15, 1957

2,777,539

SPRING-APPLIED DISK PARKING BRAKE

Loren F. Thorla, Jr., Zanesville, Ohio

Application December 5, 1952, Serial No. 324,219

3 Claims. (Cl. 188—71)

This invention relates to an improved holding or parking brake for vehicles, and more particularly to an improved holding brake in which the braking force is applied by springs or the like and the brake is released by force applied against the spring pressure.

A main object of the invention is to provide a novel and improved vehicle brake which is simple in operation, which is positive in its action and which cannot accidentally be partially applied.

A further object of the invention is to provide an improved parking or holding brake which is inexpensive to manufacture and which may be applied to the drive shaft of a vehicle.

A still further object of the invention is to provide a disk type holding brake which may be applied to the wheels of a vehicle.

A still further object of the invention is to provide a brake which is released by actuation of a pedal or the like and which is applied by similar actuation of the same pedal, the operation of the device involving a minimum amount of effort on the part of the vehicle operator.

Further objects and advantages of the invention will become apparent from the following description and claims, and from the accompanying drawings, wherein:

Figure 1 is a side elevational view, partly in vertical cross section, showing an improved brake structure applied to the drive shaft of a vehicle in accordance with the present invention.

Figure 2 is a top plan view of the main portion of the brake structure shown in Figure 1.

Figure 3 is a vertical cross sectional view taken on the line 3—3 of Figure 1.

Figure 4 is an enlarged side elevational detail view of the brake release member of the improved brake mechanism of Figure 1, the cover plate of the release mechanism being removed.

Figure 5 is a vertical cross sectional view taken on the line 5—5 of Figure 4.

Figure 6 is a vertical cross sectional view taken on the line 6—6 of Figure 5.

Figure 7 is a horizontal cross sectional view taken on the line 7—7 of Figure 5.

Figure 8 is a horizontal cross sectional view taken on the line 8—8 of Figure 6.

Figure 9 is a side elevational view, partly in cross section of a modified form of the present invention as applied to a wheel of the vehicle.

Figure 10 is a top plan view of the structure shown in Figure 9.

Figure 11 is a cross sectional detail view taken on the line 11—11 of Figure 10.

Referring to the drawings, and more particularly to Figures 1 to 8, there is shown a conventional internal combustion engine 11 having a clutch housing 12 and transmission case 13 secured thereto. There is represented at 14 the floor of a conventional automobile body beneath which the transmission case 13 is disposed. Projecting rearwardly from the transmission case 13 and integral therewith is a square hollow projection 15 coaxial with transmission shaft 16, which projects from case 13 and is connected to drive shaft 17, as by a universal joint 18. Slidably received in the interior bore 19 of projection 15 is a sleeve 21 to which is fixed a circular disc 22 having an opening 23 through which shaft 16 passes. Mounted within the bore 24 of sleeve 21 and surrounding shaft 16 is a compression spring 25 having one end thereof seated on the disk 22 and having the other end engaging the housing 13. Designated at 26 is a yoke member having the respective spaced parallel arms 27 and 28 connected by the transverse portion 29. The yoke 26 is pivotally connected to the transmission case 13 by a vertical pivot pin 30 whose intermediate portion is received in a supporting lug 31 integrally formed in the case and whose end portions extend rotatably through the respective yoke arms 27 and 28. Projecting inwardly toward each other from the ends of the respective yoke arms 27 and 28 are the respective pin elements 32 and 33 which engage in diametrically opposed recesses formed in the sleeve member 21, the hollow projection 15 being formed with respective longitudinally extending, open-ended slots 34 and 35 through which the projections 32 and 33 extend, as shown in Figure 1. As is shown in Figure 3, the sleeve member 21 is square in cross sectional shape, and the projection 15 is similarly of a square cross sectional shape to slidably receive the sleeve member 21. Consequently, the sleeve member 21 is non-rotatable in the projection 15 but the sleeve member 21 may move longitudinally in said projection against the force of the spring 25.

Secured on the shaft 16 adjacent to and opposing the disk 22 is the brake disk 36 having secured to its peripheral portion the annular pad 37 of friction material, such as asbestos brake lining or the like. Secured on the disk 22 opposing the friction pad 37 is the metal, annular braking ring 38 which is frictionally engageable with the brake pad 37 responsive to movement of the disc member 22 to the left, as viewed in Figure 1, namely, responsive to rotation of the yoke member 26 is a clockwise direction, as viewed in Figure 2.

It will be noted from Figure 1 that the coiled spring 25 biases the brake disk 22 to the left, as viewed in Figure 1, namely, biases brake disk 22 to bring the braking ring 38 into frictional contact with the brake pad 37. The yoke member 26 is thus biased by spring 25 to rotate in a clockwise direction, as viewed in Figure 2.

Designated generally at 39 is the holding and release mechanism for the brake disk 22. The mechanism 39 comprises a rectangular housing 40 provided with the cover plate 41. Rotatably mounted on a shaft 42 extending transversely through the housing 40 and journaled in the cover plate 41 and the major wall of the housing opposite said cover plate are the oval cam member 43, the ratchet disc 44 and the cruciform member 45, said last-named member 43, 44 and 45 being rigidly coupled together for simultaneous rotation on the shaft 42 by a coupling pin 46, as shown in Figure 5. The upper portion of the housing 40 is formed with the integral block portion 47, said block portion being formed with the respective rectangular bores 48 and 49 extending longitudinally of the housing 40, the bore 48 being in the plane of the oval cam 43 and the rectangular bore 49 being in a plane adjacent to the plane of the cruciform member 45.

Slidably positioned in the bore 48 is the bar member 50 which is provided at its lower end, as viewed in Figure 5, with a roller bearing 51 which is engageable with the peripheral surface of the oval cam 43, said roller being lockingly receivable in respective arcuate notches 52 and 53 formed on the respective major and minor axes of the oval cam 43. Pivotally connected at 54 to the top end of the bar 50 is the arm 55 which is secured to a shaft 56 rotatably mounted on the top end of the housing 40 for rotation on a transverse horizontal axis, as viewed in Figures 1 and 4, whereby the arm 55 is rotatable in a vertical plane. Secured to the shaft 56 is another arm 57, and connecting the ends of the arm 57 and the extension 58 of the yoke arm 27 is a link rod 59. As will be apparent from Figures 2 and 4, the yoke 26 will be rotated counterclockwise responsive to clockwise rotation of arm 55, as viewed in Figures 2 and 4 and vice versa.

The housing 40 is provided with the cavity 60 in which the members 43, 44 and 45 are rotatable. Suitably pivoted in the housing 60 at 61 is a pawl member 62 which extends in the plane of the ratchet disc 44 and which engages the toothed periphery of said disc to limit the disc to clockwise rotation, as viewed in Figure 4, whereby the cam member 43 and the cruciform member 45 may rotate only in a clockwise direction, as viewed in Figure 4.

Slidably positioned in the rectangular bore 49 and guided by said bore for longitudinal movement in the housing 40 is the bar member 63, said bar member having resiliently secured thereto the laterally projecting dog element 64. The dog element 64 is pivoted to the lower end portion of the bar 63 at 65 and is biased outwardly by a leaf spring 66 secured to the intermediate portion of the bar 63 and overlying a reduced arm 67 projecting upwardly from the dog lever 64. The lower end of the dog element 64 is engageable with one of the arms of the cruciform member 45 responsive to downward movement of the bar 63 to rotate the cruciform member 45 substantially through an angle of 90° responsive to a downward stroke of the bar member 63, and may be lifted relative to the cruciform member since the leaf spring 66 allows the pawl element 64 to be elevated past the next successive arm of the cruciform member. Thus, with the parts arranged as in Figure 4, a downward stroke of the bar 63 causes the pawl element 64 to rotate the cruciform member arm, shown at 67, downwardly through an angle of substantially 90°, in a clockwise direction, as viewed in Figure 4, and on the return stroke, the spring 66 allows the projection 64 to be drawn upwardly past the downwardly rotated arm 67 into position for the next stroke. The bar member 63 projects upwardly through the floor 14 of the vehicle and is provided at its top end with a pedal button 68 which may be engaged by the operator's foot. Secured on the intermediate portion of the bar member 63 is the collar 69, and surrounding the bar member 63 below collar 69 is the coil spring 70 which bears between collar 69 and the top end of housing 40 to bias the bar member 63 upwardly.

In operation, with the parts arranged as shown in Figure 4, the brake disk 22 is held in a retracted position relative to the friction material 37, and the shaft 16 is free to rotate. In this position the roller bearing 51 engages in a notch 53 on the major axis of the cam 43. To release the brake disc 22, the operator depresses the push button 68 by pressing downwardly thereon with his foot, whereby the bar member 63 moves downwardly and the pawl element 64 thereof rotates the cruciform member 45 clockwise, as viewed in Figure 4, through an angle of approximately 90°. This rotates the cam 43 90° clockwise and seats the roller 51 in a notch 52 located along a minor axis of the cam 43. The arm 57 is thus rotated counterclockwise as viewed in Figure 4, since the bar member 50 descends from the position thereof shown in Figure 4, whereby the link rod 59 rotates the yoke 26 clockwise, as viewed in Figure 2, moving the cam disc 22 to the left, as viewed in Figures 1 and 2, and bringing the metal ring 38 into frictional braking engagement with the friction band 37.

This applies a braking force to the shaft 16 and prevents the shaft 16 from relative to the casing 13. To release the brake it is merely necessary to again depress the push button 68, causing the bar 63 and its associated pawl element 64 to rotate the cruciform member 45 clockwise, as viewed in Figure 4, through another 90° angle, whereby the roller 51 is moved into a notch 53 located along a major axis of the cam 43, thereby elevating the bar 50 and returning the elements to the positions thereof shown in Figure 4. This action rotates arm 55 and shaft 56 clockwise, as viewed in Figure 4, and produces a counterclockwise rotation of the yoke 26, retracting the brake disc 22 relative to the brake disc 36 and thus releasing the brake.

Referring now to the form of the invention shown in Figures 9, 10 and 11, the brake mechanism is shown applied to a rear wheel of the vehicle. Figures 9 and 10 illustrate the brake mechanism for each rear wheel of a vehicle, the rear wheels being controlled by common pedal means, as will be presently explained. Referring now to Figures 9 and 10, a conventional rear axle and wheel assembly is shown in which the wheel 61' is rotatably mounted on axle 62' journaled on roller bearing 63' mounted in the axle housing 64'. A flange 65' is fixed to housing 64' and the housing has slidably mounted thereon the sleeve 66' having the disc 67' integral therewith. A compression spring 68' surrounds housing 64' and is mounted within the sleeve 66', thus urging the sleeve forwardly. A friction facing 69' is bonded to the disc 67' and faces a metal friction band 71' secured to the disc 72'. Disc 72' is rotatable with the wheel 61' and is secured thereto. As shown in Figure 10, spaced brackets 52' and 73', fixed to the frame 70' of the vehicle adjacent the rear axle housing 64', rotatably support the ends of a pin 75' to which is fixed a yoke 76'. Suitably fixed to the pin 75' is a lever 77' which extends at an angle to the yoke 76' and has secured to its bifurcated end a flexible cable 78' by means of an eye 79' secured to said cable. Cylindrical pins 81' secured to the ends of yoke 76' engage in the recesses 82' and prevent rotation of sleeve 66' and disc 67'. Cable 78' extends diagonally beneath the vehicle body and is joined to a similar cable 83' connected to the brake on the other rear wheel. Cables 78' and 83' engage around pulleys 84' and 85' adjacent their juncture and are secured to the forwardly extending cable 86', which terminates in an eye 87' which engages in a hole in the pedal 88' suitably pivoted at 89'. From the foregoing, it is apparent that upon depressing the foot pedal 88', the cable will be drawn forwardly, urging the yoke 76' to move the sleeve 66' against the pressure of the spring 68', and thus disengaging the friction facings 69' and 71'. To retain the brakes in disengaged positions, any suitable means may be provided for locking the pedal 88' in a clockwise rotated position, as viewed in Figure 11. Thus, any conventional manually releasable holding means may be provided adjacent the pedal 88' to secure the pedal in a depressed position, in order to maintain the brakes in a released condition. When it is desired to apply the brakes, the lever 88' may be released by disengaging the holding means, allowing the springs 68' to move the brake elements 71' and 69' into frictional engagement and to thereby hold the wheels 61' against movement.

While certain specific embodiments of improved vehicle brake structures have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a holding brake for a vehicle having driving means for propelling the vehicle, a brake surface fixedly mounted on said driving means for rotation therewith, a friction surface held against rotation and mounted for movement into and out of engagement with the brake surface, spring means yieldably urging said friction surface into engagement with said brake surface, whereby said driving means will be held against rotation and thus prevent movement of the vehicle, a push rod operatively connected to said friction surface for moving same to a retracted position against the force of said spring means responsive to rectilinear movement of said push rod, whereby to permit movement of the vehicle, a geneally oval cam rotatably mounted in the same plane as said push rod for rotation around a point substantially in alignment with said push rod, said cam engaging the end of the rod at its periphery, said periphery being cammingly engageable with the rod to move the rod rectilinearly responsive to rotation of the cam and being formed with respective detent notches at the ends of the major and minor diameters of the cam lockingly engageable with the end of said rod to retain the rod and the friction surface in either a retracted or a released position, a second push rod movably mounted adjacent the cam, and means operatively connecting the second push rod to said cam for rotating said cam.

2. In a holding brake for a vehicle having driving means for propelling the vehicle, a brake surface fixedly mounted on said driving means for rotation therewith, a friction surface held against rotation and mounted for movement into and out of engagement with the brake surface, spring means yieldably urging said friction surface into engagement with said brake surface, whereby said driving means will be held against rotation and thus prevent movement of the vehicle, a push rod operatively connected to said friction surface for moving same to a retracted position against the force of said spring means responsive to rectilinear movement of said push rod, whereby to permit movement of the vehicle, a generally oval cam rotatably mounted in the same plane as said push rod for rotation around a point substantially in alignment with said push rod, said cam engaging the end of the rod at its periphery, said periphery being cammingly engageable with the rod to move the rod rectilinearly responsive to rotation of the cam and being formed with respective detent notches at the ends of the major and minor diameters of the cam lockingly engageable with the end of said rod to retain the rod and friction surface in either a retracted or a released position, a second push rod slidably mounted adjacent the cam for movement parallel to the first-named push rod, and means operatively coupling said second push rod to said cam for rotating said cam.

3. In a holding brake for a vehicle having driving means for propelling the vehicle, a brake surface fixedly mounted on said driving means for rotation therewith, a friction surface held against rotation and mounted for movement into and out of engagement with the brake surface, spring means yieldably urging said friction surface into engagement with said brake surface, whereby said driving means will be held against rotation and thus prevent movement of the vehicle, a push rod operatively connected to said friction surface for moving same to a retracted position against the force of the spring means responsive to rectilinear movement of said push rod, whereby to permit movement of the vehicle, a generally oval cam rotatably mounted in the plane of said push rod for rotation around a point substantially in alignment with said push rod, said cam engaging the end of the rod at its periphery, said periphery being cammingly engageable with the rod to move the rod rectilinearly responsive to rotation of the cam and being formed with respective detent notches at the ends of the major and minor diameters of the cam lockingly engageable with the ends of said rod to retain the rod and the friction surface in either a retracted or a released position, and means for rotating said cam.

References Cited in the file of this patent

UNITED STATES PATENTS

| 1,322,333 | Noonan | Nov. 18, 1919 |
| 1,560,123 | Voight | Nov. 3, 1925 |
| 1,946,263 | Bach | Feb. 6, 1934 |
| 1,975,626 | Tibbetts | Oct. 2, 1934 |
| 2,252,906 | Williamson | Aug. 19, 1941 |

FOREIGN PATENTS

| 706,935 | France | Apr. 4, 1931 |